US009798498B2

(12) United States Patent
Cho et al.

(10) Patent No.: US 9,798,498 B2
(45) Date of Patent: Oct. 24, 2017

(54) METHOD OF OPERATING MEMORY CONTROLLER AND METHODS FOR DEVICES HAVING THE SAME

(71) Applicant: Samsung Electronics Co., Ltd., Suwon-si, Gyeonggi-do (KR)

(72) Inventors: Young Jin Cho, Yongin-si (KR); Seong Nam Kwon, Bucheon-si (KR); Hyun Seok Kim, Seoul (KR); Jae Geun Park, Suwon-si (KR); Seong Jun Ahn, Seoul (KR); Mi Hyang Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 285 days.

(21) Appl. No.: 14/691,704

(22) Filed: Apr. 21, 2015

(65) Prior Publication Data

US 2015/0363338 A1    Dec. 17, 2015

(30) Foreign Application Priority Data

Jun. 17, 2014  (KR) ........................ 10-2014-0073433

(51) Int. Cl.
*G06F 12/00* (2006.01)
*G06F 3/06* (2006.01)
*G06F 12/0866* (2016.01)

(52) U.S. Cl.
CPC ............ *G06F 3/0673* (2013.01); *G06F 3/061* (2013.01); *G06F 3/0656* (2013.01); *G06F 3/0659* (2013.01); *G06F 3/0679* (2013.01); *G06F 12/0866* (2013.01); *G06F 2212/1016* (2013.01)

(58) Field of Classification Search
CPC .... G06F 3/0673; G06F 3/0679; G06F 3/0656; G06F 3/0659; G06F 3/061
See application file for complete search history.

(56) References Cited

U.S. PATENT DOCUMENTS

| | | |
|---|---|---|
| 6,732,236 B2 | 5/2004 | Favor |
| 7,327,674 B2 | 2/2008 | Eberle et al. |
| 7,408,834 B2 | 8/2008 | Conley et al. |
| 7,676,633 B1 | 3/2010 | Fair et al. |
| 8,131,935 B2 | 3/2012 | Arimilli et al. |
| 8,161,222 B1 | 4/2012 | Chamseddine et al. |
| 8,291,094 B2 | 10/2012 | Bopardikar et al. |
| 8,407,432 B2 | 3/2013 | Cai et al. |
| 2010/0293312 A1 | 11/2010 | Sonnier et al. |
| 2010/0325370 A1 | 12/2010 | Cummings et al. |
| 2012/0102263 A1 | 4/2012 | Aswadhati |
| 2013/0031312 A1 | 1/2013 | Jones et al. |
| 2013/0205076 A1 | 8/2013 | Schuette et al. |
| 2013/0219129 A1 | 8/2013 | Rajagopalan et al. |

FOREIGN PATENT DOCUMENTS

WO    WO-2012175058 A1    12/2012

*Primary Examiner* — Reginald Bragdon
*Assistant Examiner* — Hannah A Faye-Joyner
(74) *Attorney, Agent, or Firm* — Harness, Dickey & Pierce, P.L.C.

(57) ABSTRACT

A method of operating a memory controller includes allocating a new entry whenever a write command is input from a host; and transferring data corresponding to an entry in a specific state among a plurality of states to the host in response to a read command output from the host, wherein the plurality of states are a FREE state, a WRITE state, a WRITE OLD state, a READ state, a PEND state, a PEND OLD state, a CACHE state, and a DEL state, and the specific state is at least one of the PEND state, the PEND OLD state, or the CACHE state.

13 Claims, 10 Drawing Sheets

FIG. 2

| | LBA | Buffer Address | Cache State Information (CSI) | Reference Count (RC) |
|---|---|---|---|---|
| ENT1 | LBA0 | ADD1 | CSI1 | RC1 |
| ENT2 | LBA100 | ADD2 | CSI2 | RC2 |
| ENT3 | LBA100 | ADD3 | CSI3 | RC3 |
| ENT4 | LBA100 | ADD4 | CSI4 | RC4 |
| | ⋮ | ⋮ | ⋮ | ⋮ |

TABLE

Cache State Information

|         | T1        | T1'         | T2  | T3  | T4  | T5  |
|---------|-----------|-------------|-----|-----|-----|-----|
| DATA_A  | 010       | 110         | 110 | 110 | 001 | 001 |
| DATA_B  | 000       | 000         | 010 | 011 | 111 | 001 |
| DATA_C  | 000       | 000         | 000 | 010 | 010 | 110 |
| DATA_Z  | 010 / 100 | 110 / 101   | 001 | 001 | 001 | 001 |

US 9,798,498 B2

METHOD OF OPERATING MEMORY CONTROLLER AND METHODS FOR DEVICES HAVING THE SAME

CROSS-REFERENCE TO RELATED APPLICATIONS

This application claims priority under 35 U.S.C. §119(a) from Korean Patent Application No. 10-2014-0073433 filed on Jun. 17, 2014, in the Korean Intellectual Property Office (KIPO), the disclosure of which is hereby incorporated by reference in its entirety.

BACKGROUND

1. Field

Example embodiments of the inventive concepts relate to a data caching method, and more particularly to a memory controller which may perform data caching in a non-blocking method, a method of operating the memory controller, and methods of operating devices including the memory controller.

2. Related Art

A data storage device includes a cache which may temporarily store user's data therein to improve restriction on a data storage method or a user's response time. The management of a cache affects performance of a data storage device, a response time of the data storage device, and an accuracy in a protocol of the data storage device.

As a data processing method using a cache in the related art, a sync method or a blocking method has been used. The sync method or the blocking method is a method of performing a next request (for example, a write request or a read request) after completely finishing a prior request (for example, a write request or a read request) so as to maintain data consistency of a data storage device.

The sync method or the blocking method may delay processing of a next request. For example, when processing of a request for one queue is delayed in a data storage device which processes a multi-queue, processing for all of the other queues is blocked, thereby lowering a performance of the data storage device.

SUMMARY

A technical object of at least some example embodiments of the inventive concepts is to provide a memory controller which is capable of instantly responding to a request without delaying all requests by supporting a non-blocking method, and does not cause an unnecessary internal buffer copy, a method of operating the memory controller, and methods of operating devices which include the memory controller.

According to at least one example embodiment of the inventive concepts, a method of operating a memory controller includes allocating a new entry whenever a write command is input from a host; and transferring data corresponding to an entry in a specific state among a plurality of states to the host in response to a read command output from the host, wherein the plurality of states are a FREE state, a WRITE state, a WRITE OLD state, a READ state, a PEND state, a PEND OLD state, a CACHE state, and a DEL state, and the specific state is at least one of the PEND state, the PEND OLD state, or the CACHE state.

The allocating may include allocating a first entry for a first write command including a first logical block address (LBA) and first data; and allocating a second entry for a second write command including a second LBA and second data.

The first LBA and the second LBA may be equal to each other.

The method may further include mapping between a first buffer address which indicates a first buffer region of a buffer to store the first data and the first LBA; and mapping between a second buffer address which indicates a second buffer region of the buffer to store the second data and the second LBA.

The method of operating a memory controller may further include changing a first state of the first entry according to whether or not the first data starts to be written in the first buffer region and whether or not the first data is completely written in the first buffer region; and changing a second state of the second entry according to whether or not the second data starts to be written in the second buffer region and whether or not the second data is completely written in the second buffer region, wherein the first state and the second state are different from each other at a specific time.

The specific time may be a time when the first data and the second data is written at the same time.

The method may further include changing the first state from the WRITE state to the WRITE OLD state and maintaining the second state in the WRITE state when the second data is written in the second buffer region while the first data is written in the first buffer region.

The method may further include changing the first state from the WRITE OLD state to the PEND OLD state and maintaining the second state in the WRITE state when the first data is completely written in the first buffer region while the second data is written in the second buffer region.

The method may further include changing the second state from the WRITE state to the PEND state and, at the same time, changing the first state from the PEND OLD state to the DEL state when the second data is completely written in the second buffer region.

The method may further include informing a process being executed by a CPU in accordance with firmware of a change of the first state from the PEND OLD state to the DEL state.

The specific state may indicate that the data among the plurality of data stored in a buffer is data which is most recently stored in the buffer at a time when the read command is received.

A representation of the specific state may include a bit which indicates whether the data is data read by a prefetch operation.

The transferring to the host may include transferring the write data to the host as the data, when write data corresponding to the write command is completely written in a second buffer region of a buffer while read data read by an external memory according to the read command is written in a first buffer region of the buffer.

According to at least one example embodiment of the inventive concepts, a method of operating a data storage device including a buffer and a memory controller includes allocating, by the memory controller, a new entry whenever a write command is input to the data storage device from a host; and transferring, by the memory controller, data which is most recently stored at a time when a read command is received, among a data stored in the buffer, to the host in response to the read command output from the host.

The allocating may include allocating a first entry for a first write command which includes a first logical block address (LBA) and first data; and allocating a second entry for a second write command which includes a second LBA and second data, wherein the first LBA and the second LBA are equal to each other.

The method may further include mapping between a first buffer address which indicates a first buffer region of a buffer to store the first data and the first LBA; mapping between a second buffer address which indicates a second buffer region of the buffer to store the second data and the second LBA; changing a first state of the first entry according to whether or not writing of the first data to the first buffer region starts and whether or not the first data is completely written in the first buffer region; and changing a second state of the second entry according to whether or not writing of the second data to the second buffer region starts and whether or not the second data is completely written in the second buffer region, wherein the first state and the second state are different from each other at a specific time.

The data may be data related to the write command or data related to the read command.

According to at least one example embodiment of the inventive concepts, a method of operating a data storage device including a buffer and a memory controller includes allocating, by the memory controller, a first buffer address of the buffer to a first logical block address (LBA) in response to receiving a first write command from a host, the first write command being a write command for the first LBA; performing a first writing operation by writing first data to a first buffer location identified by the first buffer address in accordance with the first write command; and allocating, by the memory controller, a second buffer address of the buffer to the first LBA in response to receiving a second write command from the host during the first writing operation, the second write command being a write command for the first LBA, the first buffer address and the second buffer address identifying different locations within the buffer, respectively.

The method may further include receiving a read command for the first LBA from the host; selecting data from among data stored at buffer addresses in the buffer that corresponds to the first LBA, the selected data being data for which storage has most recently been completed; and transferring the selected data to the host.

The method may further include forming, in response to the first write command, a first entry in an entry table stored in the data storage device, the first entry mapping the first LBA to the first buffer address, the first entry including a first state corresponding to the first buffer address; forming, in response to the second write command, a second entry in the entry table, the second entry mapping the first LBA to the second buffer address, the second entry including a second state corresponding to the second buffer address; changing the first state of the first entry according to whether or not the first writing operation has started and whether or not the first writing operation has been completed; and changing the second state of the second entry according to whether or not an operation of writing the second data to the second buffer location has started and whether or not the operation of writing the second data to the second buffer location has been completed, wherein each of the first state and the second state are different from each other at a specific time.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 2 is an example embodiment of an entry table which is managed by a management module shown in FIG. 1;

FIG. 6 is a table which shows data shown in FIG. 5 and cache state information of the data;

DETAILED DESCRIPTION

Figure 1:
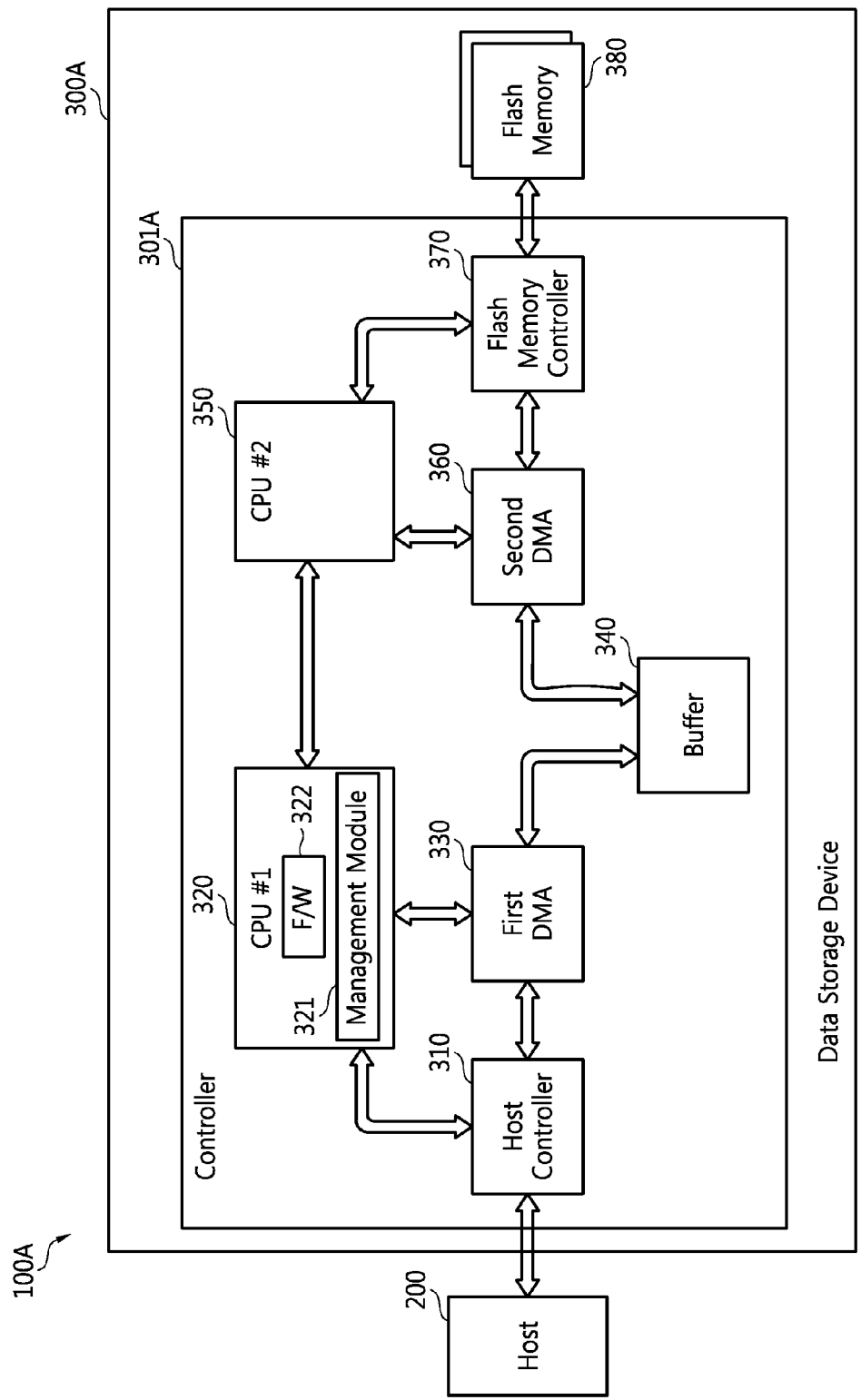
FIG. 1 is a block diagram of a data processing system according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system according to at least one example embodiment of the inventive concepts. Referring to FIG. 1, a data processing system 100A may include a host 200 and a data storage device 300A.

The data processing system 100A may be embodied in a personal computer (PC), a device which is capable of providing a database service, a network-attached storage (NAS), or a portable electronic device.

The portable electronic device may be embodied in a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book.

The host 200 may control an operation of the data storage device 300A. The host 200 may perform a write operation to write write data in the data storage device 300A or a read operation to read read data from the data storage device 300A. Accordingly, the host 200 may transfer a command necessary for a write operation or a read operation to the data storage device 300A.

For example, in order to perform a write operation, the host 200 may transfer a write command which includes a start logical block address (LBA), a sector count, and write data to the data storage device 300A. Moreover, in order to perform a read operation, the host 200 may transfer a read command which includes a start LBA and a sector count to the data storage device 300A. At this time, the sector count may represent a magnitude of data to be processed in a write operation or a read operation.

The host 200 may mean an integrated circuit, a system on chip (SoC), an application processor (AP), a mobile AP, or a portable electronic device which can be connected to the data storage device 300A.

The data storage device 300A may store data (for example, data in a write operation or data in a read operation). The data storage device 300A may be a flash-based memory device. The flash-based memory device may be embodied in a solid state drive (SSD), a universal flash storage (UFS), a multimedia card (MMC), an embedded MMC (eMMC), a memory card, or a Non-volatile memory express (NVMe). However, the data storage device 300A may be embodied in a non-volatile memory device other than the flash-based memory device.

The data storage device 300A may include a memory controller 301A and a memory 380. For example, the data storage device 300A may be embodied in an integrated manner with respect to the host 200, and may be embodied in a detachable manner with respect to the host 200. Moreover, the data storage device 300A may be embodied in an integrated type with the host 200.

The memory controller 301A may buffer write data output from the host 200 during a write operation and store the buffered write data in the memory 380, or buffer read data output from the memory 380 during a read operation and transfer the buffered read data to the host 200.

The memory controller 301A may be embodied in an integrated circuit or a SoC. The memory controller 301A may include a host controller 310, a first CPU 320, a first direct memory access (DMA) 330, a buffer 340, a second CPU 350, a second DMA 360, and a flash memory controller 370. According to at least some example embodiments of the inventive concepts, the host controller 310 may include the first DMA 330, and the flash memory controller 370 may include the second DMA 360.

The host controller 310 may transfer a start LBA and a sector count included in a write command output from the host 200 to the first CPU 320, and transfer a start LBA and a sector count included in a read command output from the host 200 to the first CPU 320.

The host controller 310 may transfer write data included in the write command output from the host 200 to the first DMA 330, and transfer read data transferred from the first DMA 330 to the host 200.

The first CPU 320 may control an operation of each of the host controller 310, the first DMA 330, and/or the second CPU 350. For example, the first CPU 320 may control a command and/or data transmitted to, or received from, the host 200. The first CPU 320 may implement a management module 321 and execute one or more processes specified by firmware 322.

The management module 321 is a module which manages a position or an address of the buffer 340 in which a logical block, e.g., write data or read data, is stored when user data (e.g., write data) is stored in the buffer 340 through the first DMA 330 or when data (for example, read data) output from the memory 380 are stored in the buffer 340 through the second DMA 360.

For example, the management module 321 may manage mapping information between a start logical block address (LBA) included in a write command (or read command) and a buffer address of the buffer 340, supply a position (or address) of a logic block to the firmware 322, or one or more processes defined by the firmware 322, or a hardware block (for example, 330, 350, and/or 360) which may process the logic block, track data (for example, write data or read data) most recently stored in the buffer 340, and process state invalidation by simultaneous writing (or overwriting).

The simultaneous writing (or overwriting) means a method of writing write data corresponding to each of a plurality of write commands having the same LBA in each of a plurality of buffer regions, and the simultaneous writing (or overwriting) will be described in detail referring to FIGS. 4 to 7.

The management module 321 may be referred to as a cache abstract layer (CAL) in some cases, and may be embodied in firmware or software.

The firmware 322, or one or more processes defined by the firmware 322, may control the management module 321, and control an operation of the host controller 310, the first DMA 330, and/or the second CPU 350.

The first DMA 330 may write write data output from the host controller 310 in the buffer 340 according to a control of the first CPU 320. In addition, the first DMA 330 may transfer data corresponding to an entry in a PEND state, a PEND OLD state, or a CACHE state among a plurality of data stored in the buffer 340 to the host controller 310 as read data according to a control of the first CPU 320.

The first CPU 320 may transfer control signals necessary for a write operation or a read operation to the first DMA 330. Moreover, the first CPU 320 may transfer control signals necessary for a write operation and a read operation to the second CPU 350.

When write data output from the host 200 are written in the buffer 340 or are completely written in the buffer 340, the first DMA 330 may transfer an indication signal which indicates a start of a write operation and completion of the write operation to the management module 321. Accordingly, the management module 321 may change cache state information (for example, CSI2, CSI3, and CSI4 of FIG. 2) included in each of corresponding entries (for example, ENT2, ENT3, and ENT4 of FIG. 2) in response to the indication signal.

The buffer 340 may store write data to be written or read data to be read. According to at least some example embodiments of the inventive concepts, the buffer 340 may be embodied in a dynamic random access memory (DRAM), a static RAM (SRAM), or a phase change RAM (PRAM), a magnetic RAM (MRAM), or a resistive RAM (ReRAM).

It is shown in FIG. 1 that the buffer 340 is embodied inside the memory controller 301A; however, the buffer 340 may be embodied outside the memory controller 301A according to at least some example embodiments of the inventive concepts.

The second CPU 350 may control a command and/or data transmitted to, or received to from, the memory 380. Moreover, the second CPU 350 may control an operation of each of the second DMA 360 and the flash memory controller 370. For example, the first CPU 320 may transfer a start LBA and a buffer address to the second CPU 350.

During a write operation, the second DMA 360 may transfer write data stored in the buffer 340 to the flash memory controller 370 according to a control of the second CPU 350. During a read operation, the second DMA 360 may store read data output from the flash memory controller 370 in the buffer 340 according to a control of the second CPU 350.

When read data output from the flash memory controller 370 are written or are completely written in the buffer 340, the second DMA 360 may transfer an indication signal which indicates a start of a write operation and completion of the write operation to the second CPU 350. The second CPU 350 may transfer the indication signal to the management module 321. Accordingly, the management module 321 may change cache state information (for example, CSI2, CSI3, and CSI4 of FIG. 2) included in each of corresponding entries (for example, ENT2, ENT3, and ENT4 of FIG. 2) in response to the indication signal.

According to at least some example embodiments of the inventive concepts, the indication signal which is generated from the second DMA 360 may be directly transferred to the management module 321.

During a write operation, the flash memory controller 370 may store write data output from the second DMA 360 in the memory 380 according to a control of the second CPU 350. During a read operation, the flash memory controller 370 may transfer read data output from the memory 380 to the second DMA 360 according to a control of the second CPU 350.

The memory 380 may store the write data transferred from the flash memory controller 370 or the read data to be transferred to the flash memory controller 370.

The memory 380 may be embodied in a flash memory. According to at least some example embodiments of the inventive concepts, when the memory 380 is embodied in an MRAM, a PRAM, or a ReRAM, the flash memory controller 370 may be replaced with a memory controller corresponding to the MRAM, the PRAM, or the ReRAM.

Figure 3:
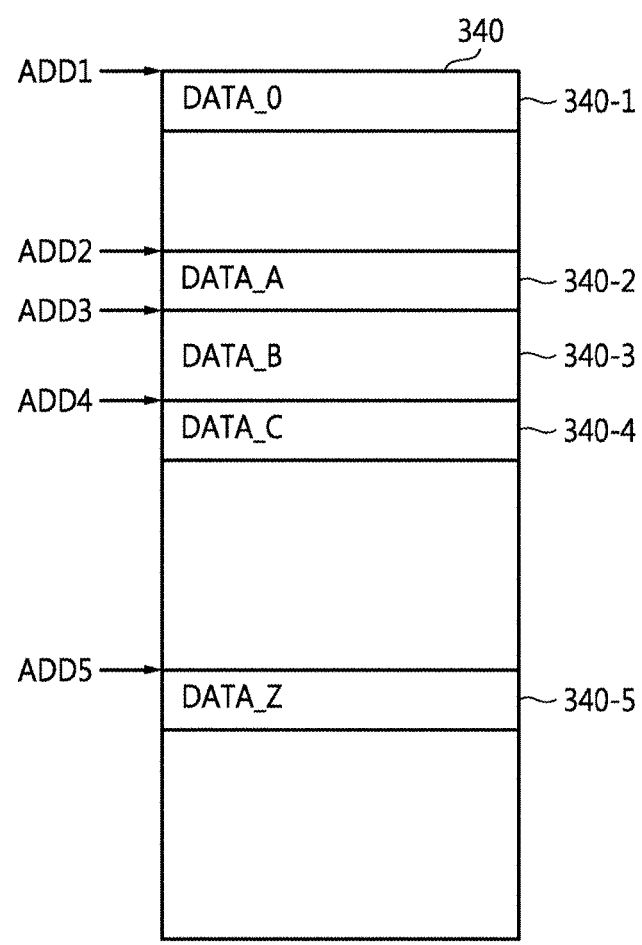
FIG. 3 is a buffer map of a buffer shown in FIG. 1.

FIG. 2 is an example embodiment of an entry table managed by the management module shown in FIG. 1, and FIG. 3 is a buffer map for a buffer shown in FIG. 1.

Referring to FIGS. 1 to 3, the management module 321 may allocate a new entry in a table whenever a write command is input through the host controller 310.

When each write command is input from the host 200, each entry (ENT1, ENT2, ENT3, ENT4, . . . ) allocated by the management module 321 may include an LBA (or a start LBA), a buffer address, cache state information CSI, and a reference count RC.

The cache state information CSI and the reference count RC will be described in detail referring to FIG. 4. The reference count RC may represent the number of read references.

For example, the management module 321 may allocate a first entry ENT1 for a first write command including a first LBA LBA0 and first data DATA_0, allocate a second entry ENT2 for a second write command including a second LBA LBA100 and second data DATA_A, allocate a third entry ENT3 for a third write command including a third LBA LBA100 and third data DATA_B, and allocate a fourth entry ENT4 for a fourth command including a fourth LBA LBA100 and fourth data DATA_C.

The second LBA LAB 100 included in the second write command, the third LBA LBA100 included in the third write command, and the fourth LBA LBA100 included in the fourth write command may be equal to each other.

The management module 321 may allocate each LBA (LBA0, LBA100, LBA100, LBA100, . . . ) included in each write command to each buffer address (ADD1, ADD2, ADD3, ADD4, . . . ). For example, the management module 321 may map between each of the LBAs (LBA0, LBA100, LBA100, LBA100, . . . ) and each of the buffer addresses (ADD1, ADD2, ADD3, ADD4, . . . ). Here, each of the buffer addresses (ADD1, ADD2, ADD3, ADD4, . . . ) may be an address which indicates each buffer region (340-1, 340-2, 340-3, 340-4, . . . ) of the buffer 340.

Figure 4:
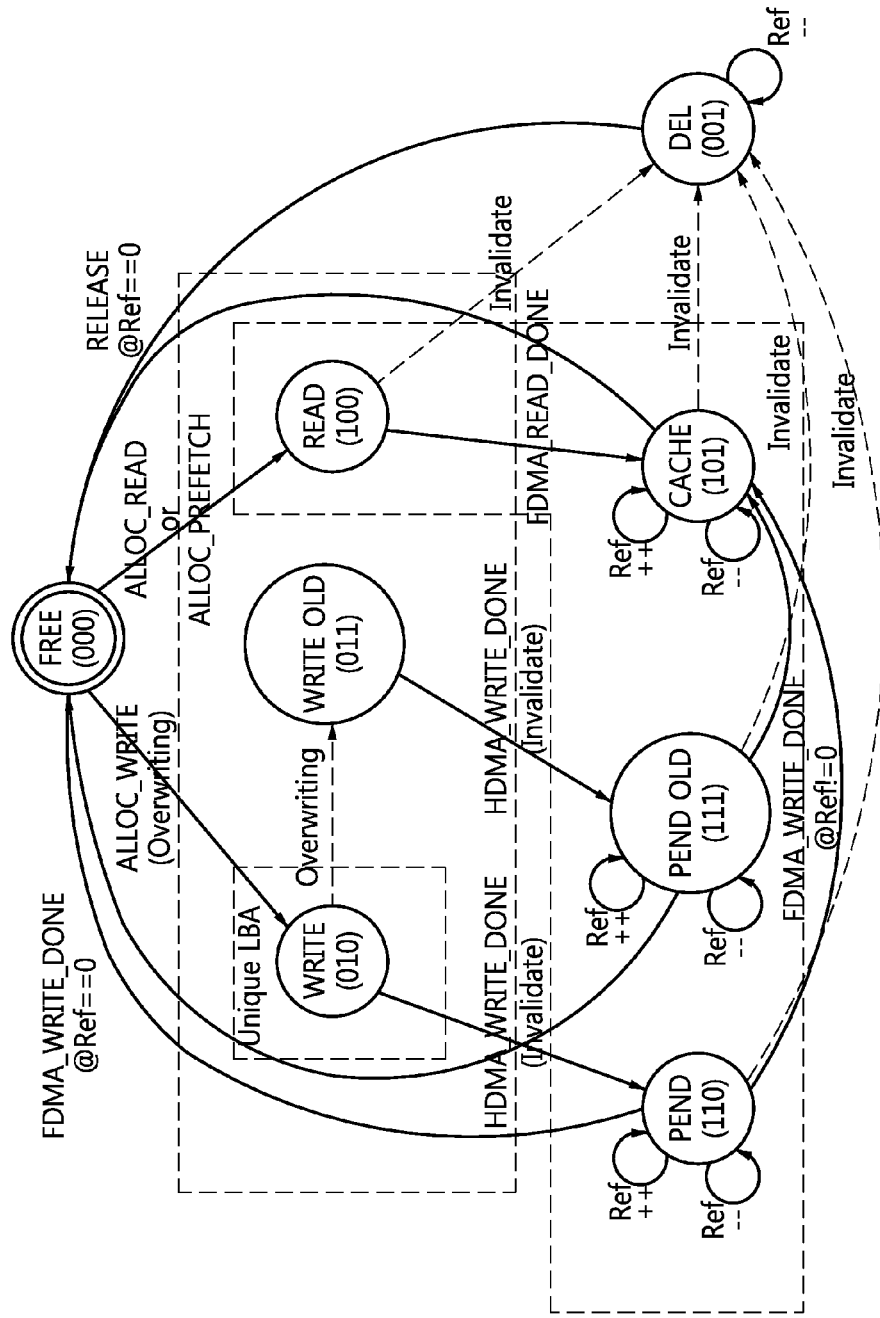
FIG. 4 is a state diagram of states which are managed by the management module shown in FIG. 1.

Each cache state information (CSI1, CSI2, CSI3, CSI4, . . . ) included in each entry (ENT1, ENT2, ENT3, ENT4, . . . ) may include a plurality of bits which indicate each state (FREE, WRITE, WRITE OLD, READ, PEND, PEND OLD, CACHE, and DEL) shown in FIG. 4.

Each reference count (RC1, RC2, RC3, RC4, . . . ) included in each of the entries (ENT1, ENT2, ENT3, ENT4, . . . ) increases whenever a read reference for a logic block stored in the buffer 340 starts, and decreases whenever the read reference is completed.

Figure 5:
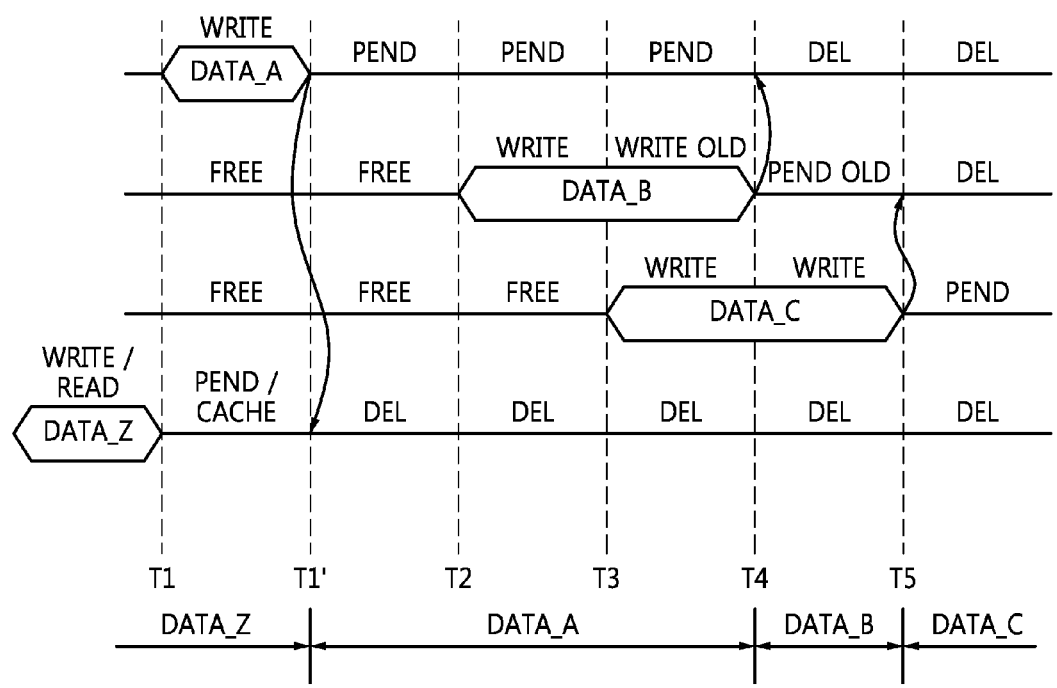
FIG. 5 is an example embodiment of a timing diagram which shows data and states processed by the data processing system shown in FIG. 1.

FIG. 4 is a state diagram of states which are managed by the management module shown in FIG. 1, FIG. 5 is an example embodiment of a timing diagram which shows data and states processed by the data processing system shown in FIG. 1, and FIG. 6 is a table which shows data shown in FIG. 5 and cache state information on the data.

Referring to FIGS. 1 to 6, FREE indicates an initialization state of the buffer 340, the management module 321 allocates a buffer address for a write operation (ALLOC_WRITE) according to a write command, the management module 321 allocates a buffer address for a read operation (ALLOC_READ) according to a read command, and the management module 321 allocates a buffer address for a prefetch operation (ALLOC_PREFETCH).

"HDMA_WRITE_DONE" indicates a completion of writing in a corresponding buffer region of the buffer 340 by the first DMA 330.

"FDMA_READ_DONE" indicates completion of writing in a corresponding buffer region of the buffer 340 by the second DMA 360.

"FDMA_WRITE_DONE" indicates completion of writing the write data stored in the buffer 340 in the memory 380 by the second DMA 360.

"Ref++" indicates an increase by "+1" whenever a read reference is started, "Ref--" indicates a decrease by "-1" whenever the read reference is completed. Here, the read reference denotes an operation of reading corresponding data stored in the buffer 340, or denotes an operation of reading corresponding data stored in the buffer 340 according to a read command output from the host 200. The buffer read operation may denote an operation of reading corresponding data stored in the buffer 340 by the first DMA 330 or the second DMA 360.

"Ref==0" which indicates a reference count RC is 0 indicates that no read reference is present, and "Ref!=0" which indicates the reference count RC is not 0 indicates that a read reference is present.

When the second data DATA_A are written in a second buffer region 340-2 of the buffer 340 corresponding to a second buffer address ADD2 by the first DMA 330 at a time T1 according to a second write command including the second LBA LBA100 and the second data DATA_A, the management module 321 sets the cache state information CSI2 included in the second entry ENT2 to "010" which indicates a WRITE state.

An operation of writing the second data DATA_A in the second buffer region 340-2 is performed until time T1'.

When the second data DATA_A are completely written in the second buffer region 340-2 at a time T1', the management module 321 changes the cache state information CSI2 included in the second entry ENT2 from "010" which indicates a WRITE state to "110" which indicates a PEND state.

The WRITE state denotes a state in which corresponding data are being written in the buffer 340. The PEND state denotes a state in which corresponding data is being written in the memory 380 after the corresponding data is completely written in the buffer 340, and the corresponding data which are completely written in the buffer 340 may be an object of a read reference.

The management module 321 at each time T1 and T1', before a third write command including the third LBA LBA100 the same as the second LBA LBA100 and the third data DATA_B is input, sets cache state information CSI3 included in the third entry ENT3 to "000" which indicates a FREE state. The FREE state may denote an initialization state or a de-allocation state.

When the third data DATA_B are written in a third buffer region 340-3 of the buffer 340 corresponding to the third buffer address ADD3 at a time T2, the management module 321 sets the cache state information CSI3 included in the third entry ENT3 to "010" which indicates the WRITE state. The management module 321 maintains the cache state information CSI2 included in the second entry ENT2 to be "110" which indicates the PEND state at a time T2.

When the fourth data DATA_C are written in a fourth buffer region 340-4 of the buffer 340 corresponding to a fourth buffer address ADD4 by the first DMA 330 while the third data DATA_B are written in the third buffer region 340-3 (T3), the management module 321 sets cache state information CSI4 included in the fourth entry ENT4 to "010" which indicates the WRITE state.

At a time T3, the management module 321 changes the cache state information CSI3 included in the third entry ENT3 from "010" which indicates the WRITE state to "011" which indicates WRITE OLD state, and maintains the cache state information CSI2 included in the second entry ENT2 to be "110" which indicates the PEND state.

For example, at a time T3, cache state information CSI2, CSI3, and CSI4 included in each of the entries ENT2, ENT3, and ENT4 may have different values, respectively. WRITE OLD is a state which indicates that the third data DATA_B being written in the third buffer region 340-3 are no longer latest data.

When the third data DATA_B are completely written in the third buffer region 340-3 while the fourth data DATA_C are written in the fourth buffer region 340-4 (T4), the management module 321 maintains the cache state information CSI4 included in the fourth entry ENT4 to be "010" which indicate the WRITE state.

At a time T4, the management module 321 changes the cache state information CSI3 included in the third entry ENT3 from "011" which indicates the WRITE OLD state to "111" which indicates the PEND OLD state. At a time T4, the cache state information CSI2 included in the second entry ENT2 is changed from "110" which indicates the PEND state to "001" which indicates a DEL state.

Only the PEND OLD state is present at a time T4.

The PEND OLD state denotes a state in which corresponding data is completely written in the buffer 340, but the corresponding data is not written in the memory 380. That is, since data corresponding to the PEND state are present in the buffer 340, data corresponding to the PEND OLD state do not need to be written in the memory 380.

The DEL state denotes a state which stands by for completion of a previous read reference even though no new read reference is present. RELEASE denotes completion of a previous read reference in the DEL state. That is, when Ref is 0 in the DEL state, the DEL state is changed to the FREE state.

At a time T5, when the fourth data DATA_C are completely written in a fourth buffer region 340-4, the management module 321 changes the cache state information CSI4 included in the fourth entry ENT4 from "010" which indicates the WRITE state to "110" which indicates the PEND state.

At a time T5, the management module 321 changes the cache state information CSI3 included in the third entry ENT3 from "111" which indicates the PEND OLD state to "001" which indicates the DEL state. That is, as the cache state information CSI4 is changed from "010" which indicates the WRITE state to "110" which indicates the PEND state, the cache state information CSI3 needs to be changed from "111" which indicates the PEND OLD state to "001" which indicates the DEL state.

At a time T5, the management module 321 maintains the cache state information CSI2 included in the second entry ENT2 to be "001" which indicates the DEL state.

There is only a PEND state among a plurality of states PEND, PEND OLD, CACHE, and READ at a time T5. That is, according to one or more example embodiments of the inventive concepts, only one state among the plurality of states PEND, PEND OLD, CACHE, and READ may be present at a specific time.

As described above, when each of a plurality of write commands having the same LBA is sequentially input to the data storage device 300A, cache state information of an entry allocated for a previous write command is changed from the WRITE state to the WRITE OLD state, and cache state information of an entry assigned for a latest write command is maintained in the WRITE state. That is, only the WRITE state is present at a specific time.

When each of the data DATA_A, DATA_B, DATA_C corresponding to each write command is completely written in each of the buffer regions 340-2, 340-3, and 340-4, the WRITE state is changed to the PEND state, and the WRITE OLD state is changed to the PEND OLD state.

According to at least some example embodiments of the inventive concepts, when the host 200 outputs a read command including a start LBA and a sector count to the data storage device 300A, the read command is transferred to the management module 321 through the host controller 310. The management module 321 allocates the start LBA to a fifth buffer address ADD5.

The management module 321 searches for a table TABLE including a plurality of entries. As a result of the searching, when bits which indicate one of the PEND state, the PEND OLD state, and the CACHE state are included in cache state information of each of the entries including the start LBA (i.e., cache hit), the first DMA 330 reads fifth data DATA_Z from a fifth buffer region 340-5 of the buffer 340 using a fifth buffer address ADD5 included in an entry which includes the bits according to a control of the management module 321. The fifth data DATA_Z are transferred to the host 200 through the first DMA 330 and the host controller 310.

However, as a result of the search, when bits which indicate one of the PEND state, the PEND OLD state, and the CACHE state are not included in cache state information of each of the entries including the start LBA (i.e., cache miss), the flash memory controller 370 reads the fifth data DATA_Z from the memory 380 and transfers the read fifth data DATA_Z to the second DMA 360 according to a control of the second CPU 350. The second DMA 360 writes the fifth data DATA_Z in the fifth buffer region 340-5 indicated by the fifth buffer address ADD5.

As illustrated by the example shown in FIG. 5, since the fifth data DATA_Z is written in the fifth buffer region 340-5 until time T1, the management module 321 maintains cache state information included in a corresponding entry to be "100" which indicates the READ state.

When the fifth data DATA_Z are completely written in the fifth buffer region 340-5 at a time T1, the management module 321 changes cache state information included in a corresponding entry from "100" which indicates the READ state to "101" which indicates the CACHE state.

The READ state denotes a state in which a corresponding data is being written in the buffer 340, and the CACHE state indicates a state in which the corresponding data is completely written in the buffer 340.

When a read command is input from the host 200 until time T1', the first DMA 330 transfers the fifth data DATA_Z most recently stored in the buffer 340 to the host 200 through the host controller 310 according to a control of the management module 321. That is, the first DMA 330 transfers the fifth data DATA_Z corresponding to an entry including the CACHE state to the host 200 through the host controller 310.

When a read command is input from the host 200 between time T1' and time T4, the first DMA 330 transfers the second data DATA_A most recently stored in the buffer 340 to the host 200 through the host controller 310 according to a control of the management module 321. That is, the first DMA 330 transfers the second data DATA_A corresponding to the second entry ENT2 including the PEND state to the host 200 through the host controller 310.

When a read command is input from the host 200 between time T4 and time T5, the first DMA 330 transfers the third data DATA_B most recently stored in the buffer 340 to the host 200 through the host controller 310 according to a control of the management module 321. That is, the first DMA 330 transfers the third data DATA_B corresponding to the third entry ENT3 including the PEND OLD state to the host 200 through the host controller 310.

When a read command is input from the host 200 after time T5, the first DMA 330 transfers the fourth data DATA_C most recently stored in the buffer 340 to the host 200 through the host controller 310 according to a control of the management module 321. That is, the first DMA 330 transfers the fourth data DATA_C corresponding to the fourth entry ENT4 including the PEND state to the host 200 through the host controller 310.

In the related art, when write commands having the same LBA are sequentially input, a data storage device of the related art continuously overwrites write data corresponding to each of the write commands in the same buffer region of a buffer, and the data storage device of the related art changes cache state information to the PEND state after an operation of writing write data corresponding to a last command is completed.

Accordingly, when a read command having the LBA is input while the write data corresponding to each of the write commands are continuously written in the same buffer region of the buffer, the data storage device of the related art delays the read command until the operation of writing write data corresponding to a last command is completed.

However, the data storage device 300A according to at least one example embodiment of the inventive concepts may transfer data most recently stored in the buffer 340 to the host at a time when the read command is received even though a write command and a read command having the same LBA are input. Accordingly, the data storage device 300A may transfer data corresponding to a read command to the host 200 in a non-blocking method.

According to at least some example embodiments of the inventive concepts, when the fifth data DATA_Z are completely written in the fifth buffer region 340-5 at a time T1, the management module 321 changes cache state information included in an entry related to the fifth data DATA_Z from "010" which indicates the WRITE state to "110" which indicates the PEND state.

When the second data DATA_A are completely written in the second buffer region 340-2 at a time T1', the management module 321 changes the cache state information CSI2 included in the second entry ENT2 from "010" which indicates the WRITE state to "110" which indicates the PEND state. At the same time or in a parallel manner, the management module 321 changes cache state information included in an entry related to the fifth data DATA_Z from "110" which indicates the PEND state to "001" which indicates the DEL state. That is, according to one or more example embodiments of the inventive concepts, only one entry including the PEND state is be present at a time T1'.

When a read command is input from the host 200 until time T1', the first DMA 330 transfers the fifth data DATA_Z most recently stored in the buffer 340 to the host 200 through the host controller 310 according to a control of the management module 321. That is, the first DMA 330 transfers the fifth data DATA_Z corresponding to an entry including the PEND state to the host 200 through the host controller 310.

When the cache state information CSI2 of the second entry ENT2 is in one of the PEND state, the PEND OLD state, the CACHE state, and the READ state, if the cache state information CSI3 of the third entry ENT3 is changed from the WRITE state to the PEND state or is changed from the WRITE OLD state to the PEND OLD state, the cache state information CSI2 of the second entry ENT2 is changed from one of the above states to the DEL state.

Figure 7:
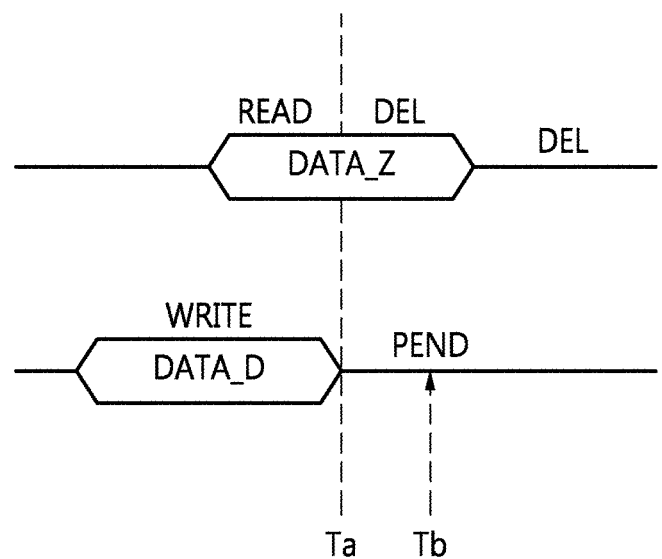
FIG. 7 is another example embodiment of the timing diagram which shows data and states processed by the data processing system shown in FIG. 1.

FIG. 7 is another example embodiment of the timing diagram which shows data and states processed by the data processing system shown in FIG. 1.

Referring to FIGS. 3, 4, and 7, the fifth data DATA_Z output from the memory 380 are written in the fifth buffer region 340-5 according to a read command including a start LBA LBA100.

When the fifth data DATA_Z are written in the fifth buffer region 340-5 until time Ta, cache state information included in a corresponding entry is maintained to be "100" which indicates the READ state.

However, when sixth data DATA_D are completely written in a sixth buffer region of the buffer 340 according to a write command including a start LBA LBA100 at a time Ta, the management module 321 changes cache state information included in a corresponding entry from "010" which indicates the WRITE state to "110" which indicates the PEND state.

Here, the management module 321 changes cache state information included in a corresponding entry from "100" which indicates the READ state to "001" which indicates the DEL state at a time Ta.

When a read command is input from the host 200 at a time Tb, the first DMA 330 transfers sixth data DATA_D most recently stored in the buffer 340 to the host 200 through the host controller 310 according to the read command. That is, the first DMA 330 transfers the sixth data DATA_D corresponding to an entry including the PEND state to the host 200 through the host controller 310.

As described above, only one of states READ, PEND, PEND OLD, and CACHE is present at a specific time.

When each of the plurality of entries ENT2 to ENT4 includes the same LBA LBA100, and cache state information of one of the plurality of entries ENT2 to ENT4 is changed from the WRITE state to the PEND state or is changed from the WRITE OLD state to the PEND OLD state, cache state information of another entry is changed from one of the READ state, the PEND state, the PEND OLD state, and the CACHE state to the DEL state.

According to at least some example embodiments of the inventive concepts, when successive read operations are forecasted according to successive read commands, the flash memory controller 370 may prefetch data from the memory 380 and store the prefetched data in the buffer 340 through the second DMA 360 according to a control of the second CPU 350.

Here, the management module 321 may include a bit in cache state information CSI, which may distinguish whether data stored in the buffer 340 are read data read according to a normal read operation or read data read according to a prefetch operation.

For example, bits which indicate the CACHE state are shown as "101" for convenience of description in FIG. 4; however, the management module 321 may set the bits which indicate the CACHE state to "1010" or "1011".

For example, when the bits which indicate the CACHE state are 1010, the firmware 322, or one or more processes defined by the firmware 322, may determine that data stored in the buffer 340 are data read according to a normal read operation according to bits (that is, 1010) output from the management module 321. Moreover, when the bits which indicate the CACHE state are "1011", the firmware 322, or one or more processes defined by the firmware 322, may determine that data stored in the buffer 340 are data read according to a prefetch operation according to bits (that is, 1011) output from the management module 321.

According to another example embodiment, when one of the READ state, the PEND state, the PEND OLD state, and the CACHE state is changed to the DEL state, the management module 321 may inform the firmware 322, or one or more processes defined by the firmware 322, of an indication bit which indicates a change to the DEL state.

Figure 8:
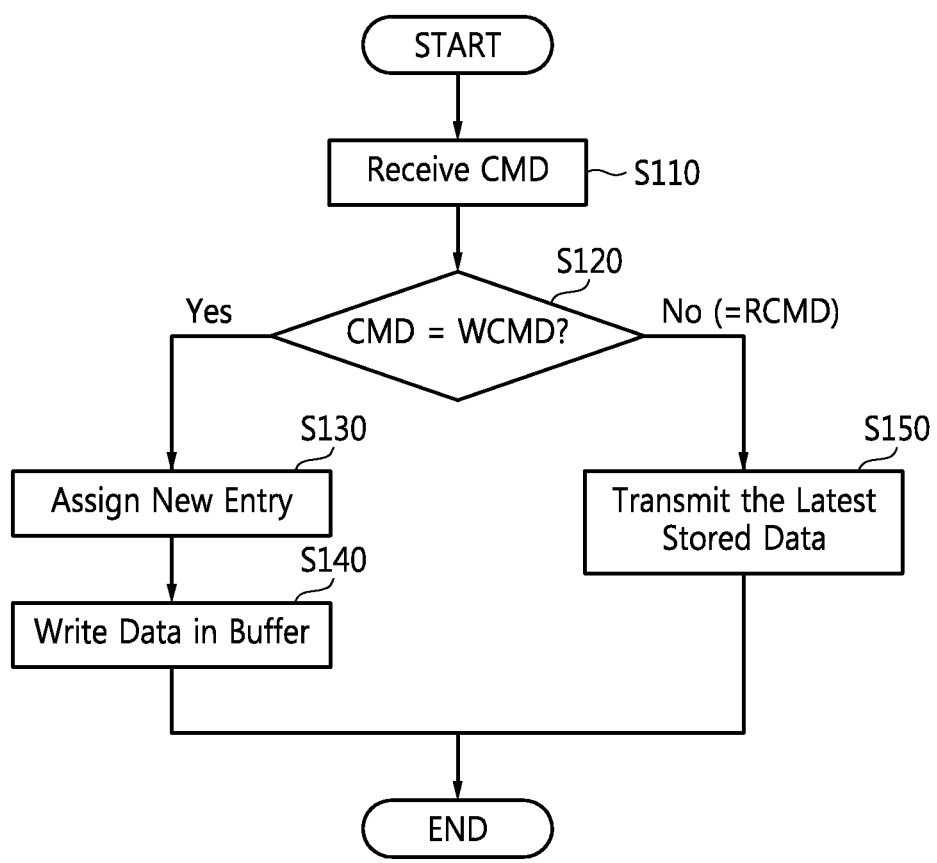
FIG. 8 is a flowchart which describes an operation of the data processing system shown in FIG. 1.

FIG. 8 is a flowchart which describes an operation of the data processing system shown in FIG. 1. Referring to FIGS. 1 to 8, the data storage device 300A, e.g., the first CPU 320, receives a command CMD from the host 200 (S110).

The data storage device 300A, e.g., the first CPU 320, determines whether the received command CMD is a write command WCMD or a read command RCMD (S120).

When the received command CMD is the write command WCMD, the data storage device 300A, e.g., the first CPU 320, allocates a new entry on a table TABLE (S130). The first DMA 330 writes data in the buffer 340 according to a control of the first CPU 320 (S140).

When the received command CMD is the read command RCMD, the first DMA 330 transfers data most recently stored among a plurality of data stored in the buffer 340 to the host 200 through the host controller 310 according to a control of the first CPU 320 (S150).

The data storage device 300A transfers data corresponding to an entry in a specific state PEND, PEND OLD, or CACHE among a plurality of states FREE, WRITE, WRITE OLD, READ, PEND, PEND OLD, CACHE, and DEL to the host 200 in response to the read command RCMD output from the host 200 (S150).

The data storage device 300A transfers data, which are most recently stored at a time when a read command RCMD is received, among the plurality of data stored in the buffer 340 to the host 200 in response to the read command RCMD output from the host 200 (S150). The data most recently stored may be determined based on a specific state PEND, PEND OLD, or CACHE.

Figure 9:
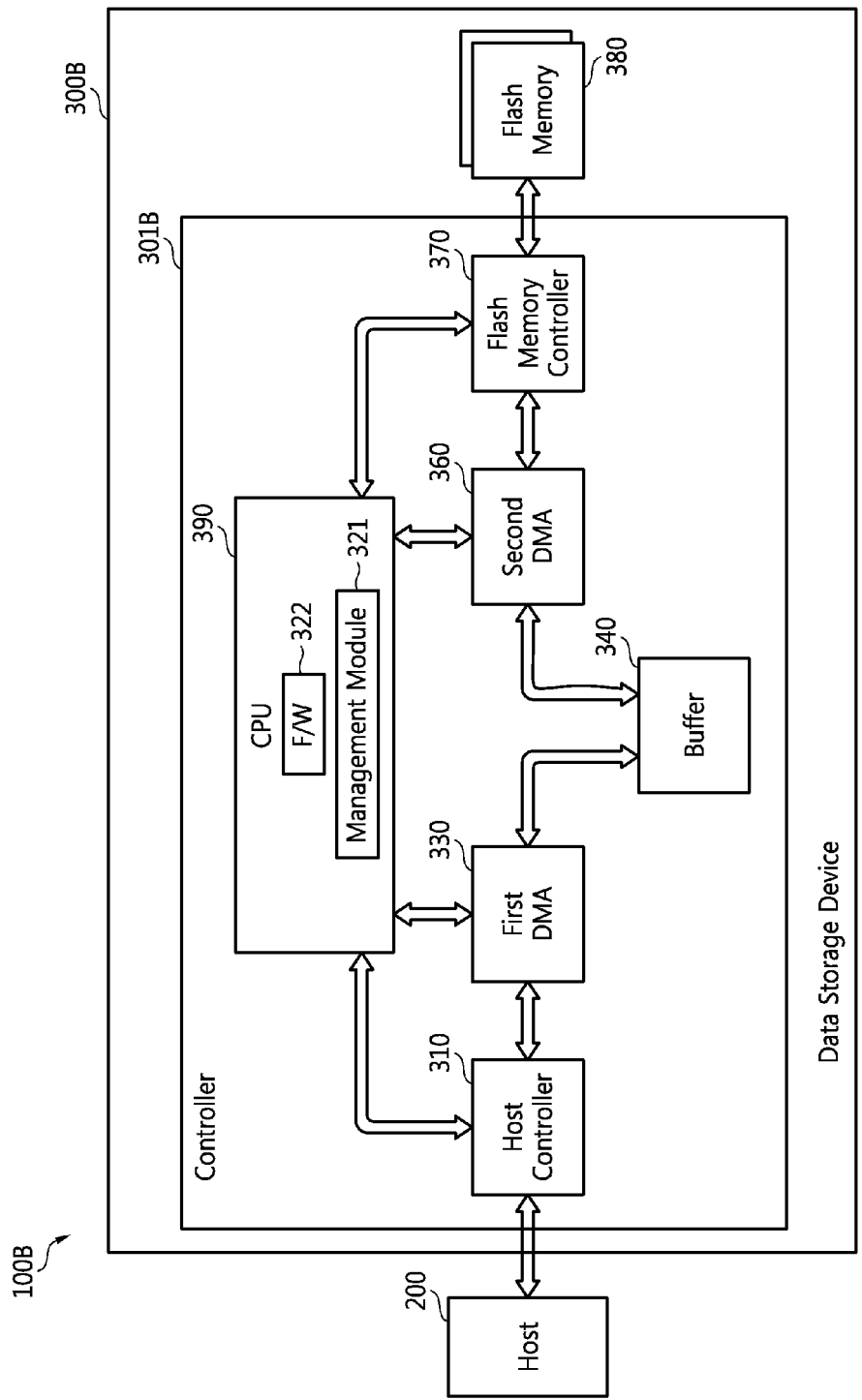
FIG. 9 is a block diagram of a data processing system according to at least another example embodiment of the inventive concepts.

FIG. 9 is a block diagram of a data processing system according to at least another example embodiment of the inventive concepts. Referring to FIGS. 1 and 9, a memory controller 301A which includes two CPUs 320 and 350 is shown in FIG. 1; however, a memory controller 301B which includes one CPU 390 is shown in FIG. 9.

That is, the CPU 390 of FIG. 9 may perform all functions of the CPUs 320 and 350 of FIG. 1. Accordingly, a structure and an operation of a data processing system 100A which are described with reference to FIGS. 1 to 8 are substantially the same as a structure and an operation of a data processing system 100B which includes the host 200 and a data storage device 300B.

Figure 10:
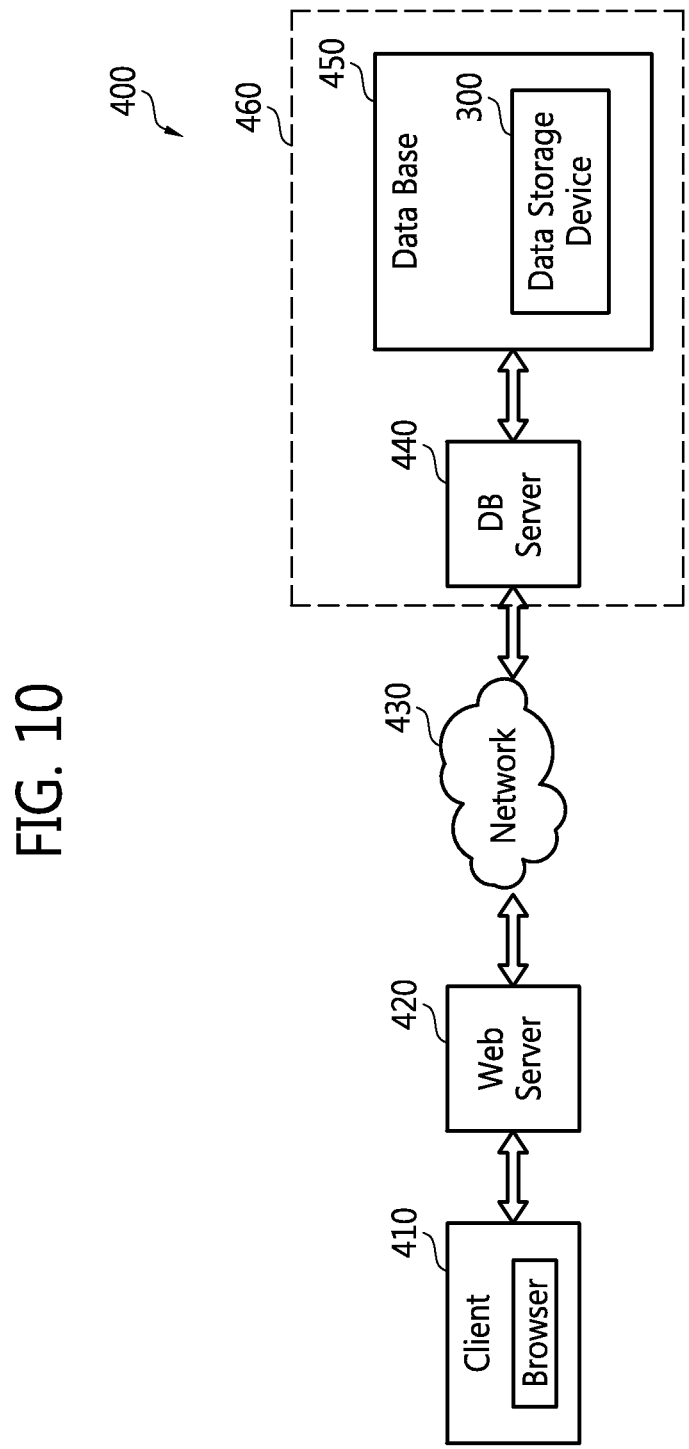
FIG. 10 is a block diagram of a data processing system according to at least another example embodiment of the inventive concepts.

FIG. 10 is a block diagram of a data processing system according to at least another example embodiment of the inventive concepts.

Referring to FIGS. 1 to 10, a data processing system 400 includes a client computer 410, a web server 420, a network 430, and a data server system 460. The data server system 460 includes a database server 440 and a database 450. For example, the data server system 460 may be a search portal or an internet data center (IDC).

The client computer 410 which may perform a browser may communicate with the web server 420 through network. The client computer 410 may be embodied in a personal computer (PC) or a portable electronic device described in FIG. 1.

The web server 420 may communicate with the database server 440 through the network 430. The database server 440 may perform a function of the host 200 of FIG. 1.

The database server 440 may control an operation of the database 450. The database server 440 may access the database 450.

The database 450 may include a plurality of data storage devices 300. The data storage device 300A shown in FIG. 1 may be the data storage device 300B shown in FIG. 9.

The web server 420 and the database server 440 can communicate with each other through the network 430. The network 430 may be a wire network, a wireless network, the internet, or a mobile phone network.

A memory controller and an operating method thereof according to at least one example embodiment of the inventive concepts can instantly respond to all requests without delaying the requests by supporting a non-blocking method, and do not cause an unnecessary internal buffer copy.

The memory controller and the operation method thereof according to at least one example embodiment of the inventive concepts can improve performance of a data storage device, particularly, a flash-based data storage device.

The memory controller and the operating method thereof according to at least one example embodiment of the inventive concepts can release an entry of a cache to reduce a buffer usage as soon as possible.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of operating a memory controller comprising:
    allocating a new entry whenever a write command is input from a host; and
    transferring data corresponding to an entry in a specific state among a plurality of states to the host in response to a read command output from the host,
    wherein the plurality of states are a FREE state, a WRITE state, a WRITE OLD state, a READ state, a PEND state, a PEND OLD state, a CACHE state, and a DEL state, and
    the specific state is at least one of the PEND state, the PEND OLD state, or the CACHE state.

2. The method of operating a memory controller of claim 1, wherein the allocating includes:
    allocating a first entry for a first write command including a first logical block address (LBA) and first data; and
    allocating a second entry for a second write command including a second LBA and second data.

3. The method of operating a memory controller of claim 2, wherein the first LBA and the second LBA are equal to each other.

4. The method of operating a memory controller of claim 3, further comprising:
    mapping between a first buffer address which indicates a first buffer region of a buffer to store the first data and the first LBA; and
    mapping between a second buffer address which indicates a second buffer region of the buffer to store the second data and the second LBA.

5. The method of operating a memory controller of claim 4, further comprising:
    changing a first state of the first entry according to whether or not the first data starts to be written in the first buffer region and whether or not the first data is completely written in the first buffer region; and
    changing a second state of the second entry according to whether or not the second data starts to be written in the second buffer region and whether or not the second data is completely written in the second buffer region,
    wherein the first state and the second state are different from each other at a specific time.

6. The method of operating a memory controller of claim 5, wherein the specific time is a time when the first data and the second data is written at the same time.

7. The method of operating a memory controller of claim 5, further comprising:
    changing the first state from the WRITE state to the WRITE OLD state and maintaining the second state in the WRITE state when the second data is written in the second buffer region while the first data is written in the first buffer region.

8. The method of operating a memory controller of claim 7, further comprising:
    changing the first state from the WRITE OLD state to the PEND OLD state and maintaining the second state in the WRITE state when the first data is completely written in the first buffer region while the second data is written in the second buffer region.

9. The method of operating a memory controller of claim 8, further comprising:
    changing the second state from the WRITE state to the PEND state and, at the same time, changing the first state from the PEND OLD state to the DEL state when the second data is completely written in the second buffer region.

10. The method of operating a memory controller of claim 9, further comprising:
informing a process being executed by a CPU in accordance with firmware of a change of the first state from the PEND OLD state to the DEL state.

11. The method of operating a memory controller of claim 1, wherein the specific state indicates that the data which corresponds to the entry that is in the specific state is data, among a plurality of data stored in a buffer, that was stored in the buffer most recently at a time when the read command is received.

12. The method of operating a memory controller of claim 1, wherein a representation of the specific state includes a bit which indicates whether the data is data read by a prefetch operation.

13. The method of operating a memory controller of claim 1, wherein, the transferring data to the host includes, when write data corresponding to the write command is completely written in a second buffer region of a buffer while read data read by an external memory according to the read command is written in a first buffer region of the buffer,
transferring the write data to the host.

* * * * *